US005282084A

United States Patent [19]
Hatano

[11] Patent Number: 5,282,084
[45] Date of Patent: Jan. 25, 1994

[54] MULTI-LAYERED COATING FOR OPTICAL PART COMPRISING YF₃ LAYER

[75] Inventor: Takuji Hatano, Osaka, Japan

[73] Assignee: Minolta Camera Kabushiki Kaisha, Japan

[21] Appl. No.: 525,549

[22] Filed: May 18, 1990

[30] Foreign Application Priority Data

May 19, 1989 [JP] Japan .................................. 1-127271
May 19, 1989 [JP] Japan .................................. 1-127272
May 19, 1989 [JP] Japan .................................. 1-127273

[51] Int. Cl.⁵ ........................ G02B 5/20; F21V 9/06
[52] U.S. Cl. .................................. 359/360; 359/359; 359/380; 359/587
[58] Field of Search ............... 350/451–452, 350/163–166, 16–17, 320; 359/359–360, 580–590; 428/333, 702, 913.0, 913.3; 427/407.1–407.3

[56] References Cited

U.S. PATENT DOCUMENTS

| 3,330,681 | 7/1967 | Scharf et al. | 428/216 |
| 4,714,308 | 12/1987 | Sawamura et al. | 350/166 |
| 4,726,654 | 2/1988 | Kimura et al. | 350/164 |
| 4,784,467 | 11/1988 | Akatsuka et al. | 350/166 |
| 4,840,281 | 6/1989 | Phillips et al. | 359/585 |
| 4,944,581 | 7/1990 | Ichikawa | 359/580 |
| 4,979,802 | 12/1990 | Ichikawa | 350/164 |
| 4,997,241 | 3/1991 | Muratomi | 359/589 |
| 5,007,710 | 4/1991 | Nakajima et al. | 359/589 |

FOREIGN PATENT DOCUMENTS 61-28546  2/1986  Japan .
62-171878 7/1987  Japan .
2-97901   4/1990  Japan .

Primary Examiner—Bruce Y. Arnold
Assistant Examiner—Thong Nguyen
Attorney, Agent, or Firm—Price, Gess & Ubell

[57] ABSTRACT

The present invention relates to a multi-layered coating for an optical part comprising at least a YF₃ layer between a substrate and a dielectric material layer.

25 Claims, 15 Drawing Sheets

MULTI-LAYERED COATING FOR OPTICAL PART COMPRISING YF$_3$ LAYER

BACKGROUND OF THE INVENTION

This invention relates to a multi-layered coating for an optical part that is, in particular, excellent in adhesion, strength of the coating and the like.

DESCRIPTION OF THE PRIOR ART

A multi-layered coating is usually formed on the surface of an optical part such as a lens, in order to improve the reflection reducing effect or transmissivity. Therefore, the multi-layered coating is required to be excellent in durability such that it will not separated or be damaged by a frictional forces.

Recently, various kinds of optical parts made of resin have been adopted for lightening of cameras, video recorders and the like. However, when multi-layered coatings are formed on resin substrates, the resin substrates cannot be heated because of the low heat resistance of resin. Even when the multi-layered coating is formed under unheated conditions, it is poor in durability such as strength of coatings relative to adhesion, solvent resistance, environmental resistance and the like. Therefore, it is very difficult to form a multi-layered coating excellent in strength of coatings, durability and the like on the surface of resin under unheated conditions, so that the kinds of multi-layered coatings which can be formed on the surface of resin are few and limited.

There is known a technique that SiO is deposited on a resin substrate by reacting silicon and oxygen to form an interposed layer so that the adhesion and durability of the multi-layered coating formed on the resin substrate may be improved. However, the interposed layer formed of SiO is liable to be deteriorated with time, with the result that there arises such a problem that the effects of the multi-layered coating are lowered.

Further, even when a substrate made of glass is used as a substrate of an optical part, it is difficult to form a multi-layered coating excellent in strength of the coating and durability without heating the substrate made of glass.

SUMMARY OF THE INVENTION

The object of the invention is to provide a multi-layered coating which is excellent in strength of the coating related to adhesion and durability such as solvent resistance, environmental resistance and the like and being unchangeable with time.

The present invention relates to a multi-layered coating for an optical part comprising at least a YF$_3$ layer between a substrate and a dielectric material layer.

DETAILED DESCRIPTION OF THE INVENTION

Figure 1:
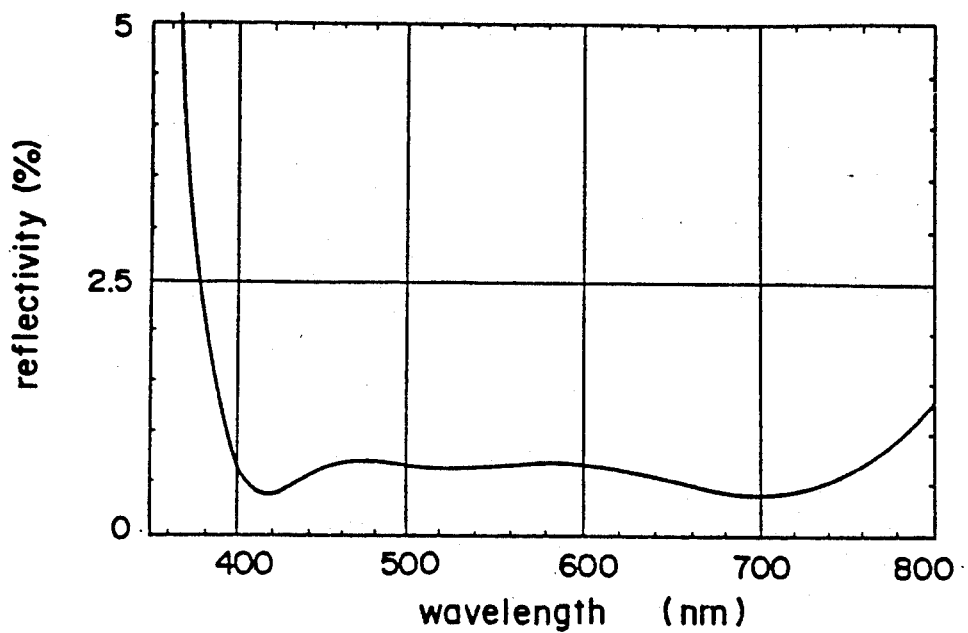
FIG. 1 represents the reflectivity across the visual spectrum for a five layer coating of Table 1.
Figure 2:
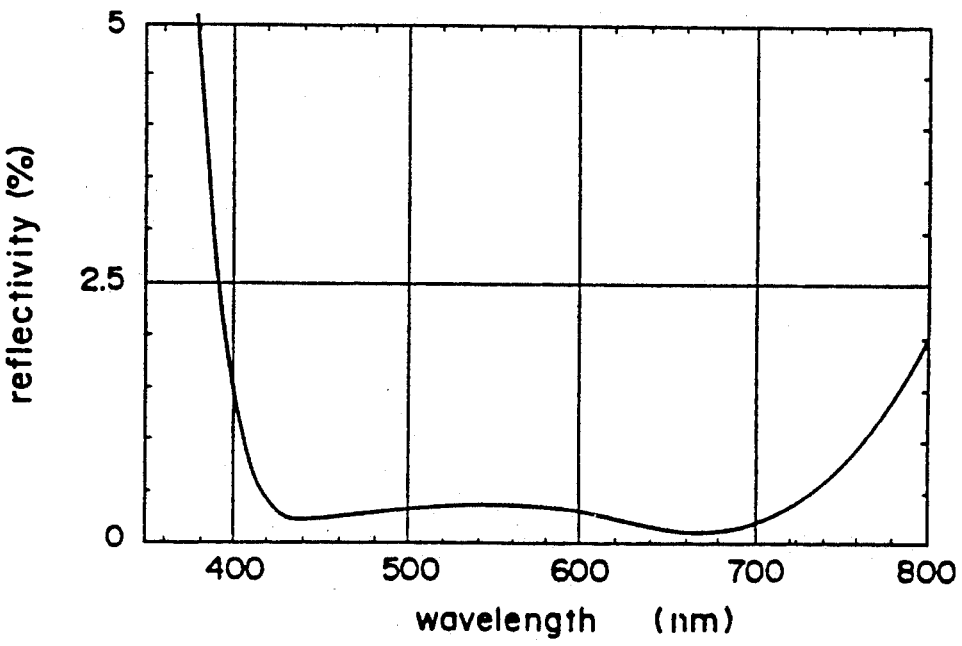
FIG. 2 represents the reflectivity across the visual spectrum for a five layer coating of Table 2.
Figure 3:
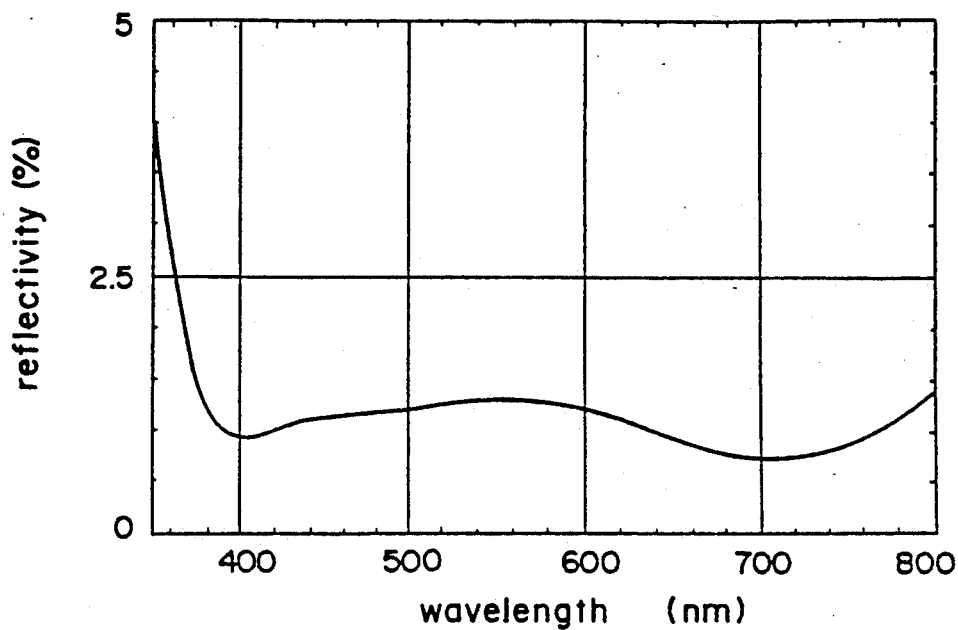
FIG. 3 represents the reflectivity across the visual spectrum for a five layer coating of Table 3.
Figure 4:
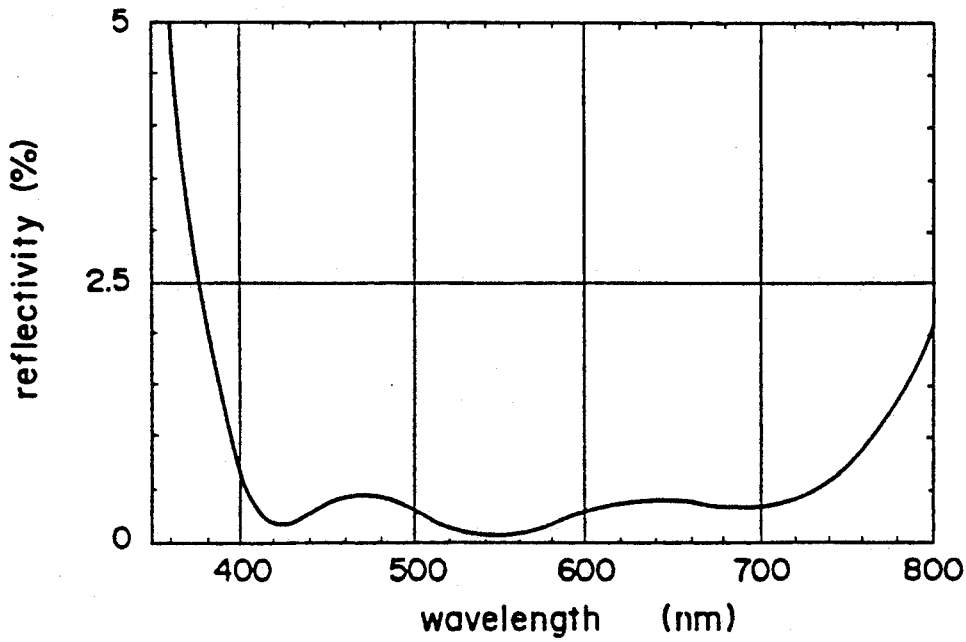
FIG. 4, represents the reflectivity across the visual spectrum for a five layer coating of Table 4.
Figure 5:
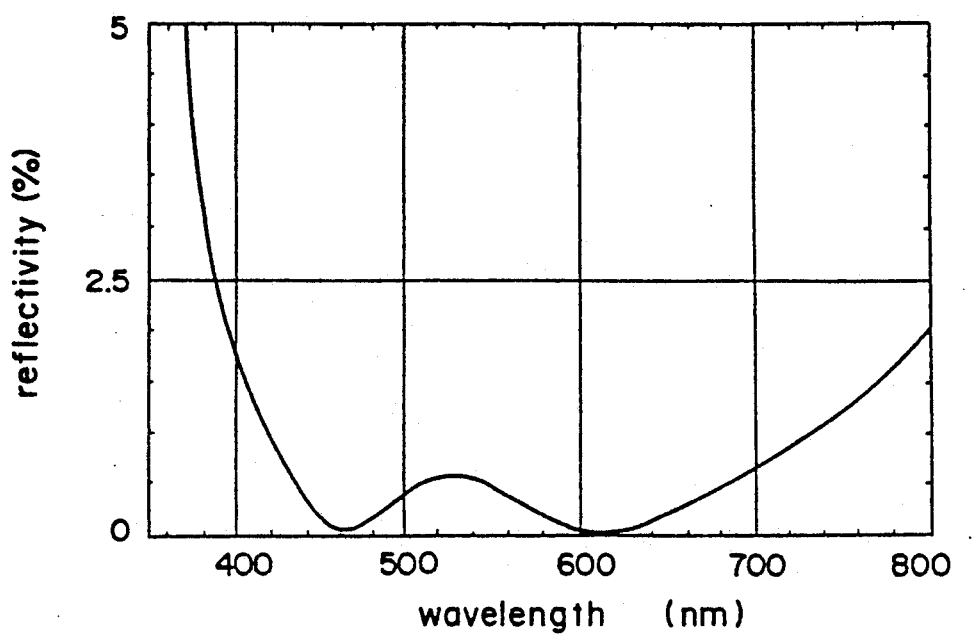
FIG. 5 represents the reflectivity across the visual spectrum for a four layer coating of Table 5.
Figure 6:
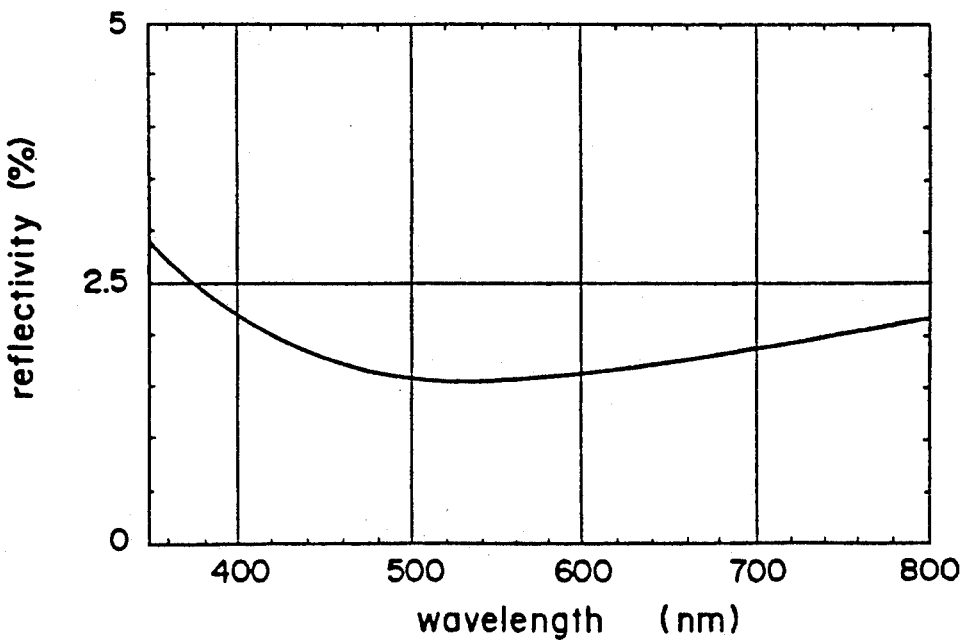
FIG. 6 represents the reflectivity across the visual spectrum for a two layer coating of Table 6.
Figure 7:
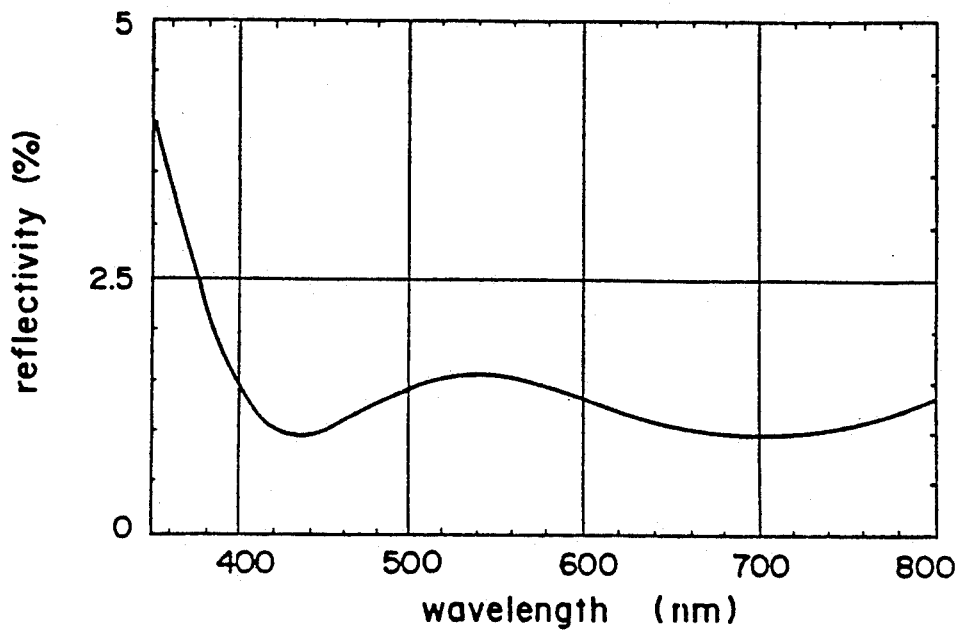
FIG. 7 represents the reflectivity across the visual spectrum for a three layer of Table 7.
Figure 8:
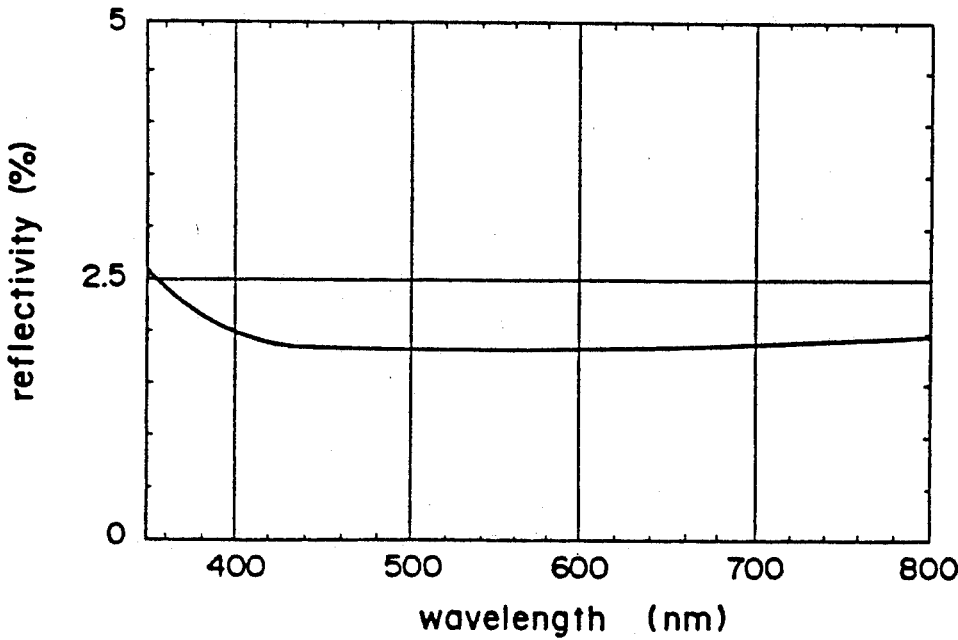
FIG. 8 represents the reflectivity across the visual spectrum for a two layer coating of Table 8.
Figure 9:
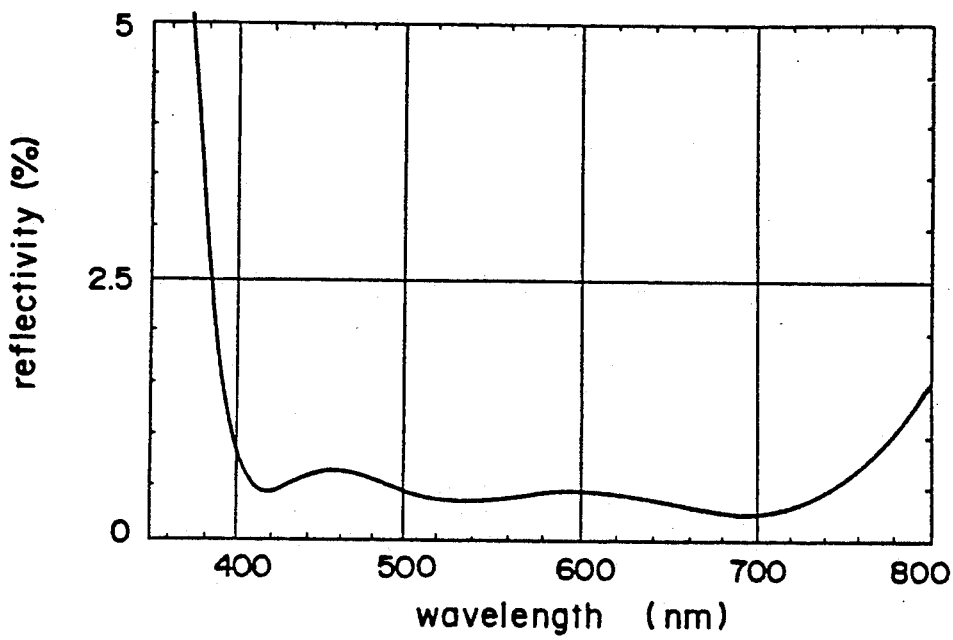
FIG. 9 represents the reflectivity across the visual spectrum for a four layer coating of Table 9.
Figure 10:
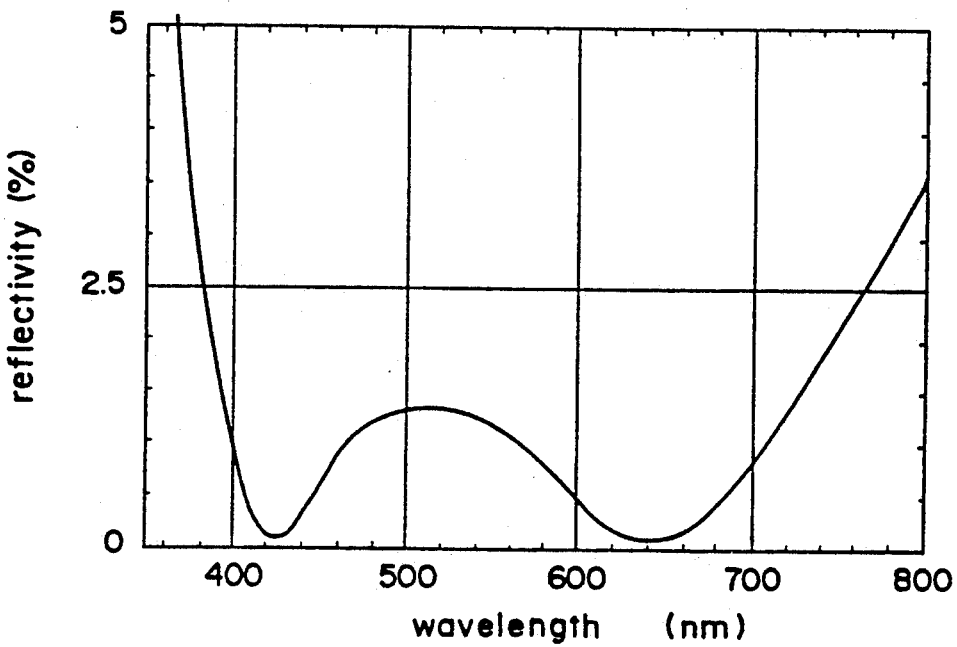
FIG. 10 represents the reflectivity across the visual spectrum for a four layer coating of Table 10.
Figure 11:
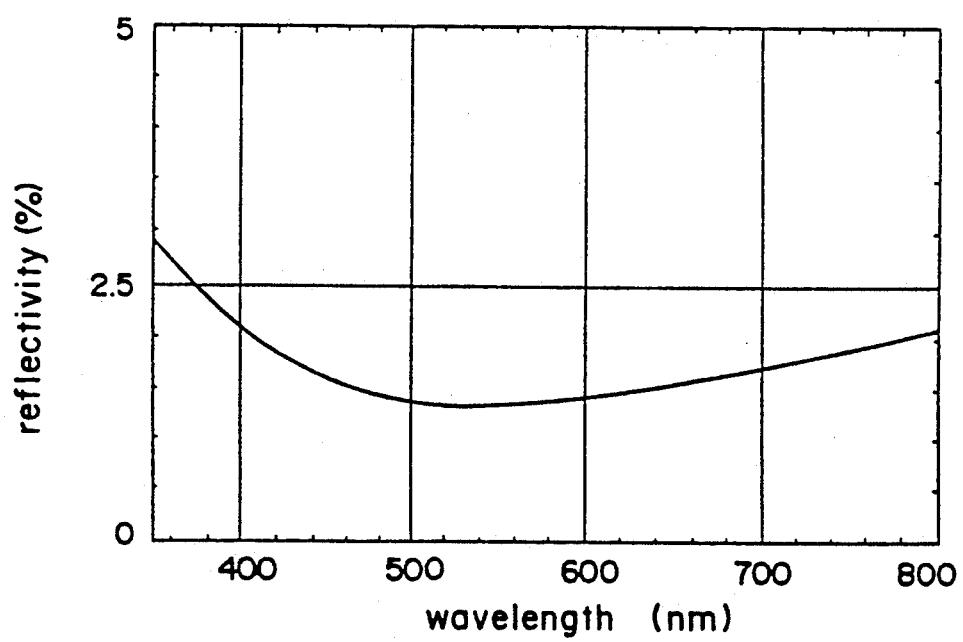
FIG. 11 represents the reflectivity across the visual spectrum for a single layer coating of Table 11.
Figure 12:
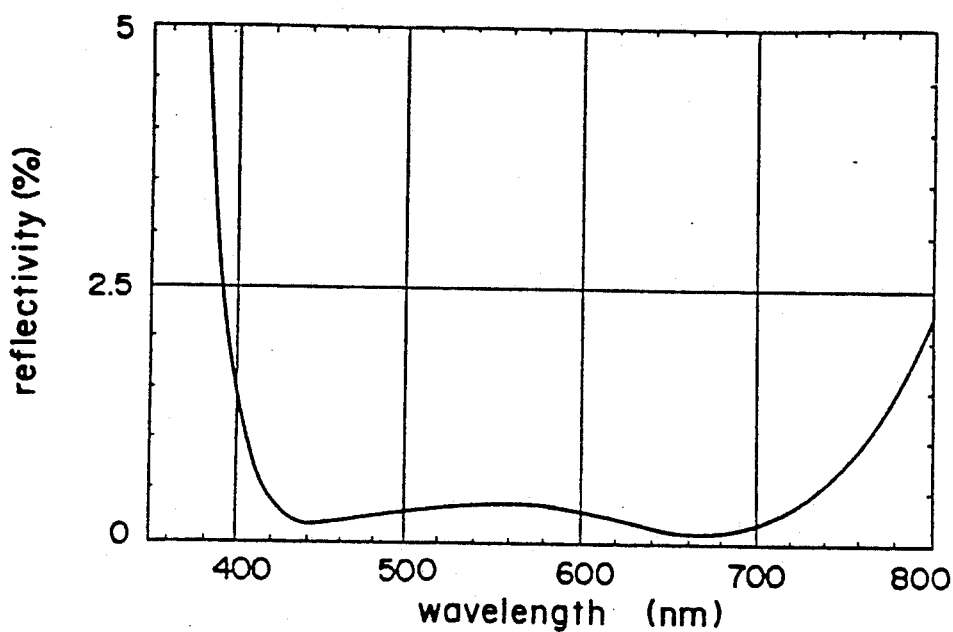
FIG. 12 represents the reflectivity across the visual spectrum for a six layer coating of Table 12.
Figure 13:
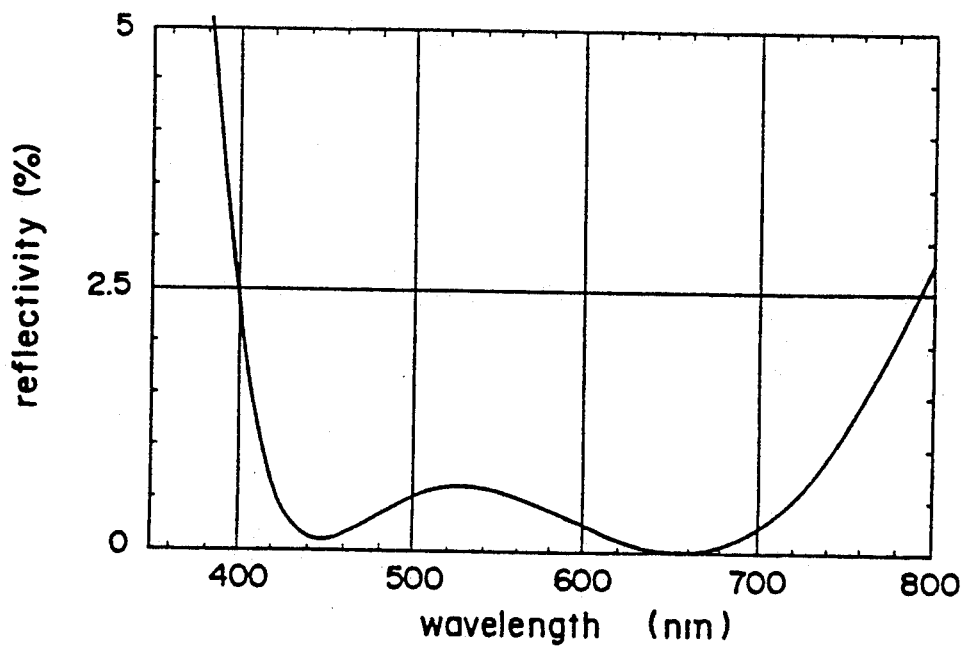
FIG. 13 represents the reflectivity across the visual spectrum for a five layer coating of Table 13.
Figure 14:
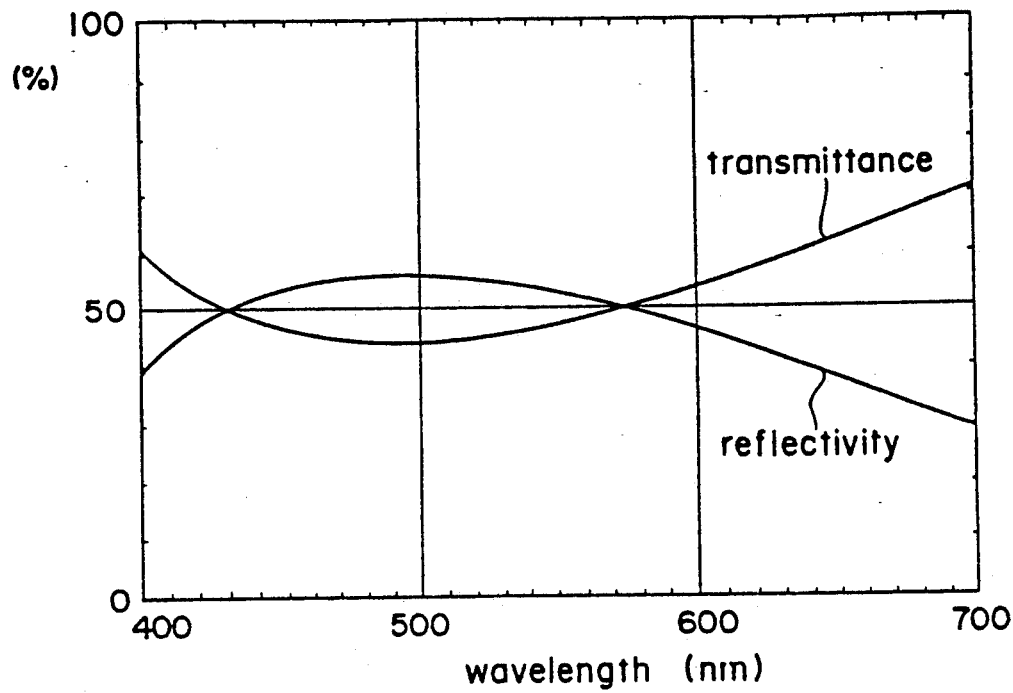
FIG. 14 shows spectral transmission and reflectivity properties of a half mirror corresponding to the constitution shown in Table 14.
Figure 15:
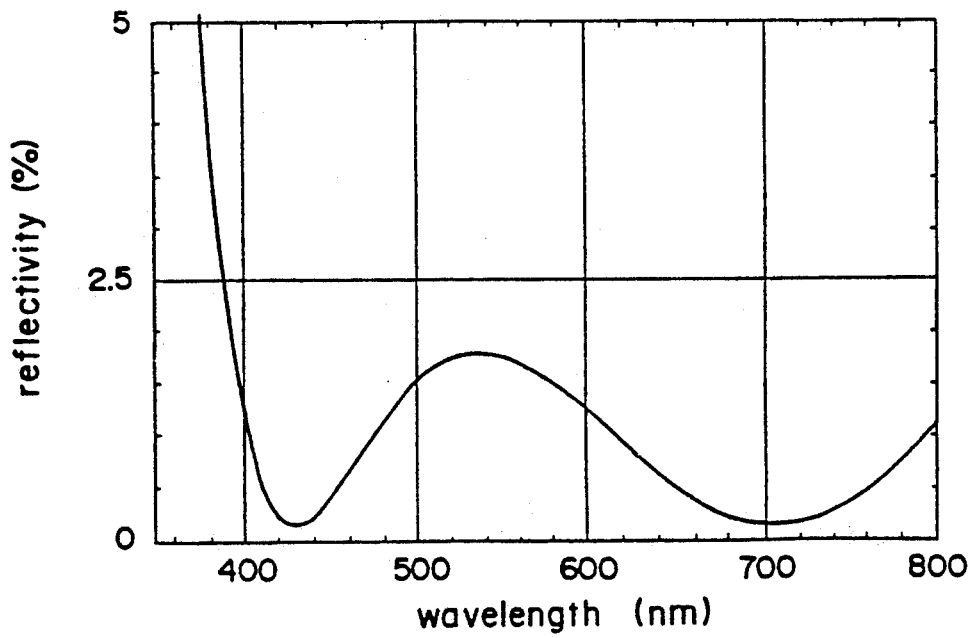
FIG. 15 represents the reflectivity across the visual spectrum for a six layer coating of Table 15.
Figure 16:
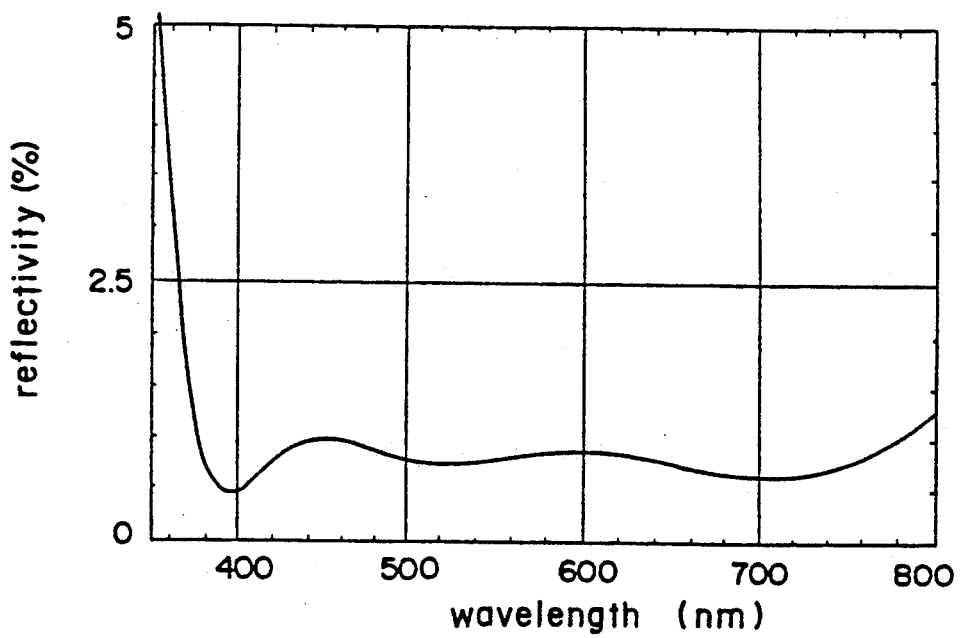
FIG. 16 represents the reflectivity across the visual spectrum for a seven layer of Table 16.
Figure 17:
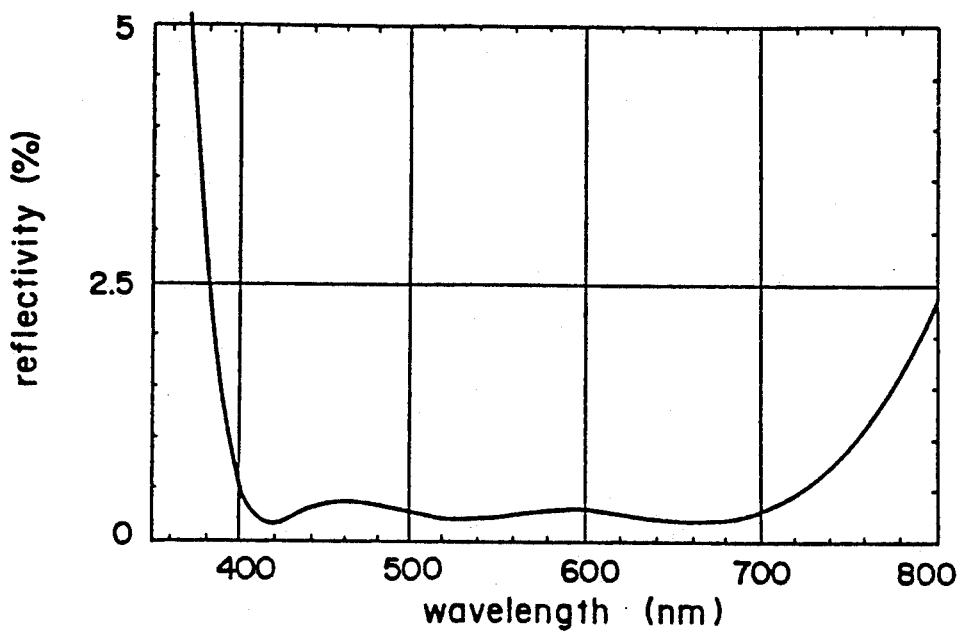
FIG. 17 represents the reflectivity across the visual spectrum for a six layer coating of Table 17.
Figure 18:
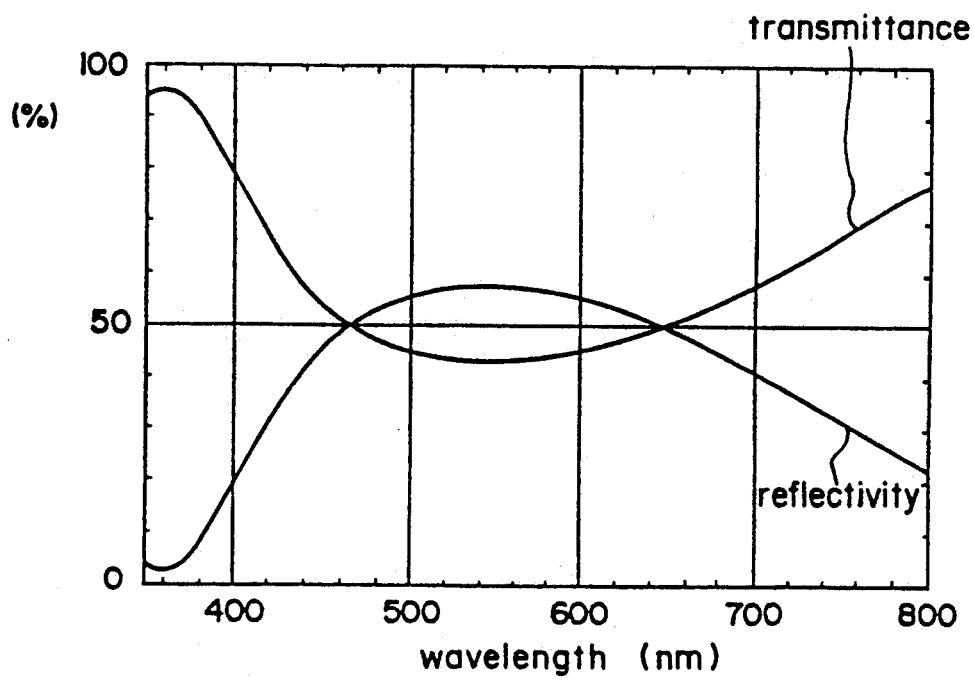
FIG. 18 shows spectral transmission and reflectivity properties of a half mirror corresponding to the constitution shown in Table 18.

The present invention provides a multi-layered coating which is excellent in strength of the coating related to adhesion and durability such as solvent resistance, environmental resistance and the like and being unchangeable with time.

The present invention has accomplished the above objects by interposing a $YF_3$ layer between a substrate and a dielectric material layer.

A multi-layered coating for an optical part of the present invention comprises at least a $YF_3$ layer formed on or over a substrate made of synthetic resin or glass.

In particular, it is preferable that when the substrate made of synthetic resin is used, the $YF_3$ layer is formed directly on the substrate and then the dielectric material layer having desired properties (for example, reflection reducing coating, a multi-layered coating for beam splitter or half mirror, and the like) is formed. The formation of the $YF_3$ layer between the substrate made of synthetic resin and the dielectric material layer effects the formation of a multi-layered coating to render it excellent in adhesion and strength of coatings because $YF_3$ has very high adhesion properties to synthetic resin. Further, because $YF_3$ is also very excellent in solvent resistance, environmental resistance and the like, this multi-layered coating comprising the $YF_3$ layer becomes excellent in solvent resistance and environmental resistance.

The substrate made of synthetic resin is not particularly limited so far as it is used usually as optical parts and exemplified by poly(methyl methacrylate) resin, polycarbonate resin, CR-39 and the like. In particular, the present invention is more effective for resin lower in heat resistance. In the case where the substrate made of poly(methyl methacrylate) resin (PMMA) is used, the refractive index of $YF_3$ is almost equal to that of PMMA that the optical properties are not influenced adversely even when a considerably thick $YF_3$ layer is interposed.

The $YF_3$ layer can be formed on the substrate made of synthetic resin without heating the substrate by depositing $YF_3$ material using a carbon crucible by means of an electron gun (E.B.). The $YF_3$ layer is formed to be 1000 Å or more, preferably 1000 Å–1 μm in thickness. If the thickness is thicker then necessary, the $YF_3$ layer is liable to crack or separate from the substrate.

In the case where a $YF_3$ layer is formed on a substrate made of glass, the same effects can be obtained as achieved when the $YF_3$ layer is formed on the substrate made of synthetic resin. In particular, the thin $YF_3$ layer having the thickness of about 500 Å, which can not be applied to the substrate made of synthetic resin, is also effective. In the case where the substrate made of glass is used, this $YF_3$ layer is not necessarily formed directly on the substrate, because the adhesion of a dielectric material layer to the substrate is relatively higher as compared with the case where the substrate made of synthetic resin is used. For example, the $YF_3$ layer may be formed at the outermost side (at the air side) to obtain a multi-layered coating excellent in strength of coatings.

When a dielectric material layer is formed on the $YF_3$ layer formed on the substrate for optical parts, the resultant multi-layered coating containing the $YF_3$ layer becomes excellent in durability and adhesion. In particular, the effects are more remarkable when the substrate made of synthetic resin is used.

The interposition of the $YF_3$ layer according to the present invention makes it possible to use various kinds of materials for deposition which could not be used before because of the lack of the strength of the coatings formed under unheated conditions. Therefore, multi-layered coatings with various kinds of optical properties suitable for reflection reducing coating, half mirror, beam splitter and the like can be formed.

In addition, a metal chromium layer may be interposed between the substrate and the $YF_3$ layer for the further improvement of the adhesion of the $YF_3$ layer to the substrate, because the metal chromium layer is highly adhesive to both the synthetic resin and the $YF_3$ layer. The multi-layered coating composed of the $YF_3$ layer and the metal chromium layer on the substrate in this order as described above is excellent in the adhesion of the multi-layered coating and environmental resistance.

The substrate made of synthetic resin is not particularly limited so far as it is used usually as optical parts, as well as the case where the $YF_3$ layer is formed directly on the substrate made of synthetic resin. In particular, the present invention is more effective for resin lower in heat resistance.

The metal chromium layer can be formed by means of an electron gun deposition method and a resistance heat deposition method. The thickness of the metal chromium layer is adjusted not to exceed 100 Å. If the thickness exceeds 100 Å, the light transmissivity is very lowered.

One more metal chromium layer may be formed on the above mentioned $YF_3$ layer. This metal chromium layer is formed thicker than the other layers and being is effective for the prevention of the generation of cracks of the $YF_3$ layer. In this case, the two metal chromium layers are formed so that the total thickness of the two may not exceed 100 Å.

The multi-layered coating having the metal chromium layer formed on the substrate for optical parts and the YF$_3$ layer formed on the metal chromium layer is more excellent in durability such as solvent resistance, environmental resistance and the like, and adhesion than the multi-layered coating having the YF$_3$ layer formed directly on the substrate.

A SiO$_2$ layer may be formed adjacent to the YF$_3$ layer in order to enhance the stability of the YF$_3$ layer. The YF$_3$ layer generates a stress in the direction of shrinkage caused naturally from the nature of YF$_3$ material itself. On the hand, SiO$_2$ layer generates a stress in the direction of expansion caused naturally from the nature of SiO$_2$ material itself. Therefore, the stress caused by the YF$_3$ layer is canceled by the stress generated in the opposite direction thereto by the SiO$_2$ layer when the SiO$_2$ layer is formed adjacent to the YF$_3$ layer. As a result, the stability of the YF$_3$ layer is thought to be enhanced. Accordingly, the cracks of the YF$_3$ layer which are liable to generate when a dielectric layer such as ZrO$_2$, TiO$_2$, Al$_2$O$_3$, Y$_2$O$_3$ or the like is formed directly on the YF$_3$ layer without interposing the SiO$_2$ layer can be prevented effectively by the SiO$_2$ layer formed adjacent to the YF$_3$ layer.

The laminated constitution of the YF$_3$ layer and SiO$_2$ layer is particularly effective when the substrate made of synthetic resin is used. In the case where the substrate made of poly(methyl methacrylate) resin is used, the formation of the YF$_3$ layer and the SiO$_2$ layer as interposed layers between the substrate and the dielectric layer influences very little the optical properties because the refractive index of SiO$_2$ and YF$_3$ is 1.49 and 1.46 respectively, being quite equal to that of the PMMA.

The SiO$_2$ layer may be formed by an electron gun deposition method, a resistance heating deposition method, an ion-plating method or the like to be 200 Å or more in thickness.

Further, the YF$_3$ layer is about 500 Å and the SiO$_2$ layer of about 500 Å may be laminated one after the other. Such a constitution is more effective for preventing the generation of cracks. In this case, the total thickness of the SiO$_2$ layer and the YF$_3$ layer is at least 1000 Å, preferably 1000 Å-1 μm. If the total thickness is thinner than 1000 Å, the resultant multi-layered coating becomes poor in solvent resistance and is liable to generate cracks in the combination with a material with strong stress.

At first, a multi-layered coating having a YF$_3$ layer adjacent to a substrate is concretely explained hereinafter.

In the case where a reflection reducing coating composed of two layers, which are referred to as the first layer and the second layer from the air side, it is preferable that the YF$_3$ layer is formed as the second layer. When the substrate is made of glass, the YF$_3$ layer is formed to be at least 500 Å. If the thickness is thinner than 500 Å, sufficient solvent resistance cannot be obtained. When the substrate is made of synthetic resin, the thickness of the YF$_3$ layer is formed to be 1000 Å-1 μm. If the thickness is thinner than 1000 Å, sufficient solvent resistance cannot be obtained. If the thickness is thicker than 1 μm, the YF$_3$ layer may crack. The first layer is formed of material with a lower refractive index than that of the substrate so that the optical layer thickness ($n_1 d_1$) may be within the range of $$0.2 \lambda_0 \leq n_1 d_1 \leq 0.3 \lambda_0$$

wherein the $\lambda_0$ represents the dominant design wavelength. If the optical layer thickness is thinner or thicker than the range as above mentioned, sufficient reflection reducing effects cannot be achieved.

In the case where a reflection reducing coating with a multi-layered coating having three layers, for layers or five layers, it is also preferable that the YF$_3$ layer is formed on the substrate. The thickness of the YF$_3$ layer is the same for the same reason as above mentioned in the two layered reflection reducing coating, that is, 500 Å or more when the substrate is made of glass and 1000 Å-1 μm when the substrate is made of synthetic resin.

When a reflection reducing coating is composed of three layers (the first layer, the second layer and the third layer from the air side), each layer except for the YF$_3$ layer is formed so that the refractive index(n), the thickness(d) and the optical layer thickness(nd) may satisfy the following relationship from the view points of reflection reducing effects. If they deviate from the that range or do not satisfy the relationship, sufficient reflection reducing effects can not be obtained.

The first layer:
refractive index $$n_1 \leq n_s$$

optical layer thickness $$0.2 \lambda_0 \leq n_1 d_1 \leq 0.3 \lambda_0,$$

The second layer:
refractive index $$1.5 \leq n_2 \leq 1.8$$

optical layer thickness $$0.15 \lambda_0 \leq n_2 d_2 \leq 0.35 \lambda_0,$$

and the third layer (YF$_3$ layer):
the thickness of the YF$_3$ layer
  substrate made of glass: 500 Å or more
  substrate made of synthetic resin: 1000 Å-1 μ
wherein
$n_s$ is the refractive index of the substrate,
$n_1$ is the refractive index of the first layer,
$n_2$ is the refractive index of the second layer,
$d_1$ is the thickness of the first layer,
$d_2$ is the thickness of the second layer and
$\lambda_0$ is a design wavelength.

When a reflection reducing coating is composed of four layers (the first layer, second layer, and third layer and the fourth layer from the air side), each of three layers except for the YF$_3$ layer is formed so that the refractive index(n), the thickness(d) and the optical layer thickness(nd) may satisfy the following relationship from the view points of reflection reducing effects. If they deviate from the range or do not satisfy the relationship, sufficient reflection reducing effects cannot be obtained.

The first layer:
refractive index $$n_1 \leq n_s$$

optical layer thickness $$0.2 \lambda_0 \leq n_1 d_1 \leq 0.3 \lambda_0,$$

the second layer:
refractive index $1.8 \leq n_2$ optical layer thickness $0.35 \leq \lambda_0 \leq n_2 d_2 \leq 0.6 \lambda_0$, the third layer:
refractive index $1.5 \leq n_3 \leq 1.8$ optical layer thickness $0.15 \lambda_0 \leq n_3 d_3 \leq 0.35 \lambda_0$ and the fourth layer ($YF_3$ layer):
the thickness of the $YF_3$ layer
    substrate made of glass: 500 Å or more
    substrate made of synthetic resin: 1000 Å–1 μm
wherein
$n_s$ is the refractive index of the substrate,
$n_1$ is the refractive index of the first layer,
$n_2$ is the refractive index of the second layer,
$n_3$ is the refractive index of the third layer,
$d_1$ is the thickness of the first layer,
$d_2$ is the thickness of the second layer,
$d_3$ is the thickness of the third layer and
$\lambda_0$ is a design wavelength.

When a reflection reducing coating is composed of five layers (the first layer, the second layer, the third layer, the fourth layer and the fifth layer from the air side), each of four layers except for the $YF_3$ layer is formed so that the refractive index(n), the thickness(d) and the optical layer thickness(nd) may satisfy the following relationship from the view points of reflection reducing effects. If they deviate from the range or do not satisfy the relationship, sufficient reflection reducing effects can not be obtained. The lower limitations of the layer thickness of the third layer and the fourth layer are specified from the viewpoints of layer-forming techniques. It is difficult to form layers thinner than the lower limitation with good reproducibility.

The first layer:
refractive index $n_1 \leq n_s$ optical layer thickness $0.2 \lambda_0 \leq n_1 d_1 \leq 0.3 \lambda_0$, the second layer:
refractive index $1.8 \leq n_2$ optical layer thickness $0.35 \lambda_0 \leq n_2 d_2 \leq 0.6 \lambda_0$, the third layer:
refractive index $n_3 \leq n_4$ optical layer thickness $0.03 \lambda_0 \leq n_3 d_3 \leq 0.25 \lambda_0$, the fourth layer:
refractive index $n_s \leq n_4$ optical layer thickness $0.03 \lambda_0 \leq n_4 d_4 \leq 0.25 \lambda_0$ and the fifth layer ($YF_3$ layer):
the thickness of the $YF_3$ layer
    substrate made of glass: 500 Å or more
    substrate made of synthetic resin: 1000 Å–1 μm
wherein
$n_s$ is the refractive index of the substrate,
$n_1$ is the refractive index of the first layer,
$n_2$ is the refractive index of the second layer,
$n_3$ is the refractive index of the third layer,
$n_4$ is the refractive index of the fourth layer,
$d_1$ is the thickness of the first layer,
$d_2$ is the thickness of the second layer,
$d_3$ is the thickness of the third layer,
$d_4$ is the thickness of the fourth layer and
$\lambda_0$ is a design wavelength.

Next, a multi-layered coating having a metal chromium layer and a $YF_3$ layer on a substrate in this order is explained hereinafter.

When a reflection reducing coating is composed of six layers (the first layer, second layer, the third layer, the fourth layer, the fifth layer and sixth layer from the air side), each layer is formed so that the refractive index(n), the thickness(d) and the optical layer thickness(nd) may satisfy the following relationship.

The first layer:
refractive index $n_1 \leq n_2$ optical layer thickness $0.2 \lambda_0 \leq n_1 d_1 \leq 0.3 \lambda_0$, the second layer:
refractive index $1.8 \leq n_2$ optical layer thickness $0.35 \lambda_0 \leq n_2 d_2 \leq 0.6 \lambda_0$, the third layer:
refractive index $n_3 \leq n_4$ optical layer thickness $0.03 \lambda_0 \leq n_3 d_3 \leq 0.15 \lambda_0$, the fourth layer:
refractive index $n_s \leq n_4$ optical layer thickness $0.03 \lambda_0 \leq n_4 d_4 \leq 0.25 \lambda_0$, the fifth layer (YF$_3$ layer):
  the thickness of the YF$_3$ layer is within the range of between 500 Å and 1 μm
and the sixth layer (the metal chromium layer):
  the thickness of the metal chromium layer is 100 Å or less
wherein
$n_s$ is the refractive index of the substrate,
$n_1$ is the refractive index of the first layer,
$n_2$ is the refractive index of the second layer,
$n_3$ is the refractive index of the third layer,
$n_4$ is the refractive index of the fourth layer,
$d_1$ is the thickness of the first layer,
$d_2$ is the thickness of the second layer,
$d_3$ is the thickness of the third layer,
$d_4$ is the thickness of the fourth layer and
$\lambda_0$ is a design wavelength.

In the multi-layered coating above, the thickness of the first, the second layer and the third layer or the fourth layer deviates from the above mentioned range, sufficient reflection reducing effects cannot be obtained. The lower limitation of the third layer is specified from the view point of a layer forming technique. If the thickness of the metal chromium layer of the sixth layer exceeds 100 Å, the transmissivity lowers and the reflection reducing effects are also influenced adversely.

When a reflection reducing coating is composed of five layers (the first layer, the second layer, the third layer, the fourth layer and the fifth layer from the air side), each layer except for the metal chromium layer and the YF$_3$ layer is formed so that the refractive index(n), the thickness(d) and the optical layer thickness(nd) may satisfy the following relationship from the view points of reflection reducing effects. If they deviate from the range or do not satisfy the relationship, sufficient reflection reducing effects can not be obtained.

The first layer:
refractive index $$n_1 \leq n_2$$

optical layer thickness $$0.2 \lambda_0 \leq n_1 d_1 \leq 0.3 \lambda_0,$$

the second layer:
refractive index $$1.8 \leq n_2$$

optical layer thickness $$0.35 \lambda_0 \leq n_2 d_2 \leq 0.6 \lambda_0,$$

the third layer:
refractive index $$1.5 \leq n_3 \leq 1.8$$

optical layer thickness $$0.15 \lambda_0 \leq n_3 d_3 \leq 0.35 \lambda_0,$$

the fourth layer (YF$_3$ layer):
  the layer thickness is within the range of between 500 Å and 1 μm and the fifth layer (metal chromium layer):
  the layer thickness is 100 Å or less
wherein
$n_s$ is the refractive index of the substrate,
$n_1$ is the refractive index of the first layer,
$n_2$ is the refractive index of the second layer,
$n_3$ is the refractive index of the third layer,
$d_1$ is the thickness of the first layer,
$d_2$ is the thickness of the second layer,
$d_3$ is the thickness of the third layer,
$\lambda_0$ is a design wavelength.

A six layered reflection reducing coating composed of the same first, second and third layers as above mentioned, the fourth layer of a metal chromium layer, the fifth layer of a YF$_3$ layer and the sixth layer of metal chromium layer may be formed. The thickness of each layer is within the same range as above mentioned.

When a reflection reducing coating is composed of seven layers (the first layer, the second layer, the third layer, the fourth layer, the fifth layer, the sixth layer and the seventh layer from the air side), each layer except for the metal chromium layer and the YF$_3$ layer is formed so that the refractive index(n), the thickness(d) and the optical layer thickness(nd) may satisfy the following relationship from the view points of reflection reducing effects. If they deviate from the range or do not satisfy the relationship, sufficient reflection reducing effects can not be obtained. The lower limitations of the layer thickness of the third layer and the fourth layer are specified from the viewpoints of layer-forming techniques. It is difficult to control the formation of layers thinner than the lower limitation with good reproducibility.

The first layer:
refractive index $$n_1 \leq n_s$$

optical layer thickness $$0.2 \lambda_0 \leq n_1 d_1 \leq 0.3 \lambda_0,$$

the second layer:
refractive index $$1.8 \leq n_2$$

optical layer thickness $$0.35 \lambda_0 \leq n_2 d_2 \leq 0.6 \lambda_0,$$

the third layer:
refractive index $$n_3 \leq n_4$$

optical layer thickness $$0.03 \lambda_0 \leq n_3 d_3 \leq 0.15 \lambda_0,$$

the fourth layer:
refractive index $$n_s \leq n_4$$

optical layer thickness $$0.03 \lambda_0 \leq n_4 d_4 \leq 0.25 \lambda_0,$$

the fifth layer:
metal chromium layer,
the sixth layer:
YF$_3$ layer
and the seventh layer:
metal chromium layer
wherein
$n_s$ is the refractive index of the substrate,
$n_1$ is the refractive index of the first layer,
$n_2$ is the refractive index of the second layer,
$n_3$ is the refractive index of the third layer,
$n_4$ is the refractive index of the fourth layer,
$d_1$ is the thickness of the first layer,
$d_2$ is the thickness of the second layer,
$d_3$ is the thickness of the third layer,
$d_4$ is the thickness of the fourth layer and
$\lambda_0$ is a design wavelength.

The present invention can be applied to a half mirror. The half mirror is exemplified by the one composed of five layers.

The first layer:
refractive index $$n_2 \leq n_1$$

optical layer thickness $$0.2 \lambda_0 \leq n_1 d_1 \leq 0.3 \lambda_0,$$

the second layer:
refractive index $$n_2 \leq n_3$$

optical layer thickness $$0.2 \lambda_0 \leq n_2 d_2 \leq 0.3 \lambda_0,$$

the third layer:
refractive index $$n_3 \leq n_s$$

optical layer thickness $$0.2 \lambda_0 \leq n_3 d_3 \leq 0.3 \lambda_0,$$

the fourth layer (YF$_3$ layer):
the layer thickness being within the range of between 500 Å and 1 μm
and the fifth layer (metal chromium layer):
the layer thickness being 100 Å or less
wherein
$n_s$ is the refractive index of the substrate,
$n_1$ is the refractive index of the first layer,
$n_2$ is the refractive index of the second layer,
$n_3$ is the refractive index of the third layer,
$d_1$ is the thickness of the first layer,
$d_2$ is the thickness of the second layer,
$d_3$ is the thickness of the third layer,
$\lambda_0$ is a design wavelength.

If the layer thickness of the first layer and third layer deviate from the above mentioned range, sufficient reflectivity and transmissivity cannot be obtained.

The constitutions of the coating as above mentioned are not limitative. Any kinds of constitutions with desired optical properties may be applied.

Then, a multi-layered coating having a SiO$_2$ layer adjacent to a YF$_3$ layer is explained hereinafter.

When a reflection reducing coating is composed of six layers (the first layer, the second layer, the third layer, the fourth layer, the fifth layer and the sixth from the air side), each layer except for the YF$_3$ layer is formed so that the refractive index(n), the thickness(d) and the optical layer thickness(nd) may satisfy the following relationship from the view points of reflection reducing effects. If they deviate from the range or do not satisfy the relationship, sufficient reflection reducing effects can not be obtained. The lower limitations of the layer thickness of the third layer and the fourth layer are specified from the viewpoints of layer-forming techniques. It is difficult to control the formation of layers thinner than the lower limitation with good reproducibility.

The first layer:
refractive index $$n_1 \leq n_s$$

optical layer thickness $$0.2 \lambda_0 \leq n_1 d_1 \leq 0.3 \lambda_0,$$

the second layer:
refractive index $$1.8 \leq n_2$$

optical layer thickness $$0.35 \lambda_0 \leq n_2 d_2 \leq 0.6 \lambda_0,$$

the third layer:
refractive index $$n_3 \leq n_4$$

optical layer thickness $$0.03 \lambda_0 \leq n_3 d_3 \leq 0.15 \lambda_0,$$

the fourth layer:
refractive layer $$n_s \leq n_4$$

optical layer thickness $$0.03 \lambda_0 \leq n_4 d_4 \leq 0.25 \lambda_0,$$

the fifth layer:
SiO$_2$ layer with thickness of 0.1 $\lambda_0$ or more and the sixth layer:
YF$_3$ layer
the total thickness of the YF$_3$ layer and the SiO$_2$ layer
wherein
$n_s$ is the refractive index of the substrate,
$n_1$ is the refractive index of the first layer,
$n_2$ is the refractive index of the second layer,
$n_3$ is the refractive index of the third layer,
$n_4$ is the refractive index of the fourth layer,
$d_1$ is the thickness of the first layer,
$d_3$ is the thickness of the third layer,
$d_4$ is the thickness of the fourth layer and
$\lambda_0$ is a design wavelength.

Dielectric materials may be used as layers with the YF₃ layer being positioned between the SiO₂ layer and a dielectric material.

The present invention is explained concretely by examples.

Reflection reducing coatings or multi-layered coatings for half mirrors shown in Tables 1 to 17 were prepared on substrates for optical parts.

The reflection reducing properties and the spectral properties of the resultant optical parts are shown in the FIGS. 1 to 17. The number of the table corresponds to the number of the figure (For example, the reflection reducing properties of the obtained reflection reducing coating prepared according to the constitution shown in Table 1 is shown in FIG. 1).

The angle of incidence is 0° in the reflection reducing coatings.

The angle of incidence is 45° in the half mirrors.

TABLE 1

(Example 1) (reflection reducing coating)

| material | refractive index (n) | optical thickness nd/λ₀ (λ₀ = 535 nm) |
|---|---|---|
| $SiO_2$ | 1.46 | 0.253 |
| $ZrO_2 + TiO_2$ | 1.94 | 0.513 |
| $SiO_2$ | 1.46 | 0.061 |
| $Y_2O_3$ | 1.70 | 0.134 |
| $YF_3$ | 1.49 | 0.75 |
| substrate PMMA | 1.49 | |

TABLE 2

(Example 2) (reflection reducing coating)

| material | refractive index (n) | optical thickness nd/λ₀ (λ₀ = 535 nm) |
|---|---|---|
| $SiO_2$ | 1.46 | 0.248 |
| $TiO_2$ | 2.22 | 0.505 |
| $SiO_2$ | 1.46 | 0.035 |
| $Y_2O_3$ | 1.70 | 0.182 |
| $YF_3$ | 1.49 | 0.750 |
| substrate PMMA | 1.49 | |

TABLE 3

(Example 3) (reflection reducing coating)

| material | refractive index (n) | optical thickness nd/λ₀ (λ₀ = 535 nm) |
|---|---|---|
| $SiO_2$ | 1.46 | 0.240 |
| $TiO_2$ | 1.85 | 0.500 |
| $Al_2O_3$ | 1.56 | 0.075 |
| $Y_2O_3$ | 1.70 | 0.088 |
| $YF_3$ | 1.49 | 0.750 |
| substrate PMMA | 1.49 | |

TABLE 4

(Example 4) (reflection reducing coating)

| material | refractive index (n) | optical thickness nd/λ₀ (λ₀ = 525 nm) |
|---|---|---|
| $SiO_2$ | 1.46 | 0.245 |
| $TiO_2$ | 2.22 | 0.502 |
| $SiO_2$ | 1.46 | 0.089 |
| $Y_2O_3$ | 2.22 | 0.054 |
| $YF_3$ | 1.49 | 0.45 |
| substrate PC | 1.58 | |

TABLE 5

(Example 5) (reflection reducing coating)

| material | refractive index (n) | optical thickness nd/λ₀ (λ₀ = 525 nm) |
|---|---|---|
| $SiO_2$ | 1.46 | 0.250 |
| $TiO_2$ | 2.22 | 0.490 |
| $Y_2O_3$ | 1.70 | 0.240 |
| $YF_3$ | 1.49 | 0.500 |
| substrate PC | 1.58 | |

TABLE 6

(Example 6) (reflection reducing coating)

| material | refractive index (n) | optical thickness nd/λ₀ (λ₀ = 525 nm) |
|---|---|---|
| $MgF_2$ | 1.385 | 0.250 |
| $YF_3$ | 1.49 | 0.750 |
| substrate PMMA | 1.49 | |

TABLE 7

(Example 7) (reflection reducing coating)

| material | refractive index (n) | optical thickness nd/λ₀ (λ₀ = 535 nm) |
|---|---|---|
| $MgF_2$ | 1.385 | 0.250 |
| $Al_2O_3$ | 1.56 | 0.500 |
| $YF_3$ | 1.49 | 0.750 |
| substrate PMMA | 1.49 | |

TABLE 8

(Example 8) (reflection reducing coating)

| material | refractive index (n) | optical thickness nd/λ₀ (λ₀ = 535 nm) |
|---|---|---|
| $MgF_2$ | 1.385 | 0.250 |
| $YF_3$ | 1.49 | 0.250 |
| substrate glass | 1.52 | |

TABLE 9

(Example 9) (reflection reducing coating)

| material | refractive index (n) | optical thickness nd/λ₀ (λ₀ = 535 nm) |
|---|---|---|
| $YF_3$ | 1.49 | 0.250 |
| $TiO_2$ | 2.22 | 0.524 |
| $SiO_2$ | 1.46 | 0.093 |
| $TiO$ | 2.22 | 0.061 |
| substrate glass | 1.52 | |

TABLE 10

(Comparative Example 1) (reflection reducing coating)

| material | refractive index (n) | optical thickness nd/λ₀ (λ₀ = 510 nm) |
|---|---|---|
| $SiO_2$ | 1.46 | 0.250 |
| $ZrO_2 + TiO_2$ | 1.94 | 0.250 |
| $ZrO_2$ | 1.82 | 0.250 |
| $SiO + O_2$ | 1.47 | 0.500 |
| substrate PMMA | 1.49 | |

TABLE 11
(Comparative Example 2) (reflection reducing coating)

| material | refractive index (n) | optical thickness nd/$\lambda_0$ ($\lambda_0$ = 510 nm) |
|---|---|---|
| MgF$_2$ | 1.385 | 0.250 |
| substrate glass | 1.52 | |

TABLE 12
(Example 10) (reflection reducing coating)

| material | refractive index (n) | optical thickness nd/$\lambda_0$ ($\lambda_0$ = 535 nm) |
|---|---|---|
| SiO$_2$ | 1.46 | 0.248 |
| TiO$_2$ | 2.22 | 0.505 |
| SiO$_2$ | 1.46 | 0.035 |
| Y$_2$O$_3$ | 1.70 | 0.182 |
| YF$_3$ | 1.49 | 0.750 |
| Cr | | (d = 25 Å) |
| substrate PM | 1.49 | |

TABLE 13
(Example 11) (reflection reducing coating)

| material | refractive index (n) | optical thickness nd/$\lambda_0$ ($\lambda_0$ = 525 nm) |
|---|---|---|
| SiO$_2$ | 1.46 | 0.250 |
| TiO$_2$ | 2.22 | 0.490 |
| Y$_2$O$_3$ | 1.70 | 0.240 |
| YF$_3$ | 1.49 | 0.500 |
| Cr | | (d = 30 Å) |
| substrate PC | 1.58 | |

TABLE 14
(Example 12) (half mirror)

| material | refractive index (n) | optical thickness nd/$\lambda_0$ ($\lambda_0$ = 535 nm) |
|---|---|---|
| TiO$_2$ | 2.20 | 0.250 |
| SiO$_2$ | 1.46 | 0.250 |
| TiO$_2$ | 2.20 | 0.250 |
| YF$_3$ | 1.49 | 0.750 |
| Cr | | (d = 30 Å) |
| substrate PMMA | 1.49 | |

TABLE 15
(Example 13) (reflection reducing coating)

| material | refractive index (n) | optical thickness nd/$\lambda_0$ ($\lambda_0$ = 535 nm) |
|---|---|---|
| SiO$_2$ | 1.46 | 0.250 |
| ZrO$_2$ + TiO$_2$ | 1.94 | 0.500 |
| Al$_2$O$_3$ | 1.56 | 0.250 |
| Cr | | (d = 30 Å) |
| YF$_3$ | 1.49 | 0.150 |
| Cr | | (d = 30 Å) |
| substrate PMMA | 1.49 | |

TABLE 16
(Example 14) (reflection reducing coating)

| material | refractive index (n) | optical thickness nd/$\lambda_0$ ($\lambda_0$ = 535 nm) |
|---|---|---|
| SiO$_2$ | 1.46 | 0.240 |
| ZrO$_2$ + TiO$_2$ | 1.94 | 0.511 |
| SiO$_2$ | 1.46 | 0.095 |
| ZrO$_2$ + TiO$_2$ | 1.94 | 0.060 |
| Cr | | (d = 25 Å) |
| YF$_3$ | 1.49 | 0.150 |
| Cr | | (d = 25 Å) |
| substrate PM | 1.49 | |

TABLE 17
(Example 15) (reflection reducing coating)

| material | refractive index (n) | optical thickness nd/$\lambda_0$ ($\lambda_0$ = 535 nm) |
|---|---|---|
| SiO$_2$ | 1.46 | 0.243 |
| TiO$_2$ | 2.22 | 0.513 |
| SiO$_2$ | 1.46 | 0.104 |
| TiO$_2$ | 2.22 | 0.058 |
| SiO$_2$ | 1.46 | 0.100 |
| YF$_3$ | 1.49 | 0.700 |
| substrate PMMA | 1.49 | |

TABLE 18
(Example 16) (half mirror)

| material | refractive index (n) | optical thickness nd/$\lambda_0$ ($\lambda_0$ = 535 nm) |
|---|---|---|
| TiO$_2$ | 2.20 | 0.250 |
| SiO$_2$ | 1.46 | 0.250 |
| TiO$_2$ | 2.20 | 0.250 |
| YF$_3$ | 1.49 | 0.250 |
| SiO$_2$ | 1.46 | 0.100 |
| YF$_3$ | 1.49 | 0.500 |
| substrate PMMA | 1.49 | |

Figure 19:
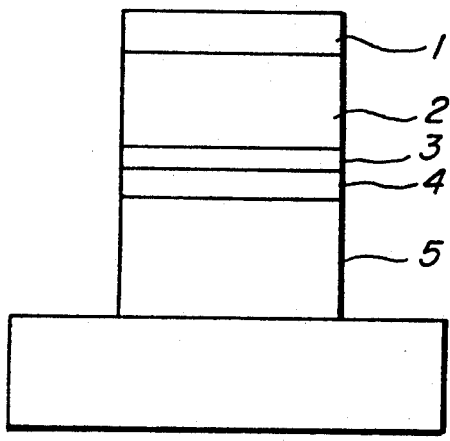
FIG. 19 shows a schematic configuration of a multi-layered coating in accordance with Example 1 with the layers numbered consecutively from the air surface to the substrate.
Figure 20:
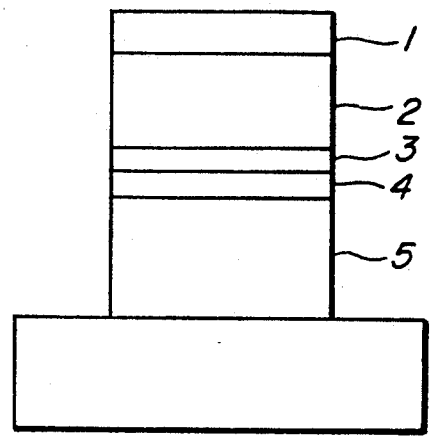
FIG. 20 shows a schematic configuration of a multi-layered coating in accordance with Example 2 with the layers numbered consecutively from the air surface to the substrate.
Figure 21:
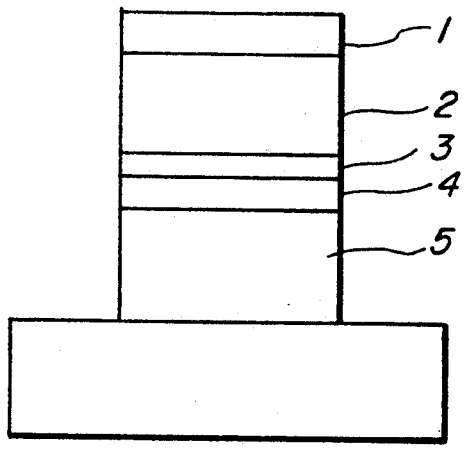
FIG. 21 shows a schematic configuration of a multi-layered coating in accordance with Example 3 with the layers numbered consecutively from the air surface to the substrate.
Figure 22:
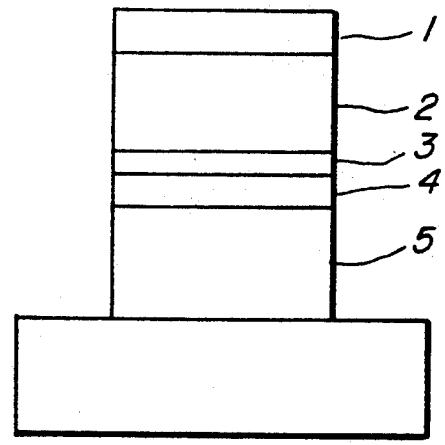
FIG. 22 shows a schematic configuration of a multi-layered coating in accordance with Example 4 with the layers numbered consecutively from the air surface to the substrate.
Figure 23:
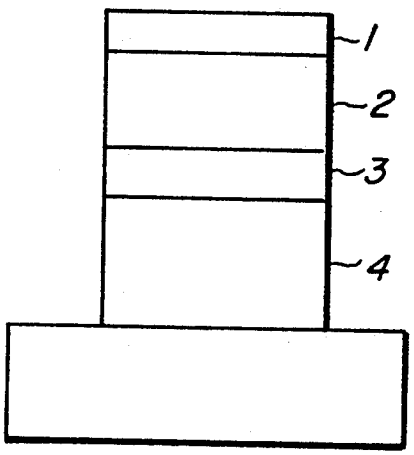
FIG. 23 shows a schematic configuration of a multi-layered coating in accordance with Example 5 with the layers numbered consecutively from the air surface to the substrate.
Figure 24:
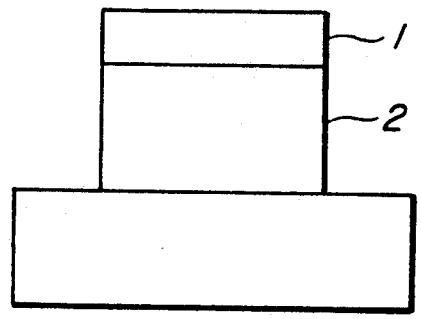
FIG. 24 shows a schematic configuration of a multi-layered coating in accordance with Example 6 with the layers numbered consecutively from the air surface to the substrate.
Figure 25:
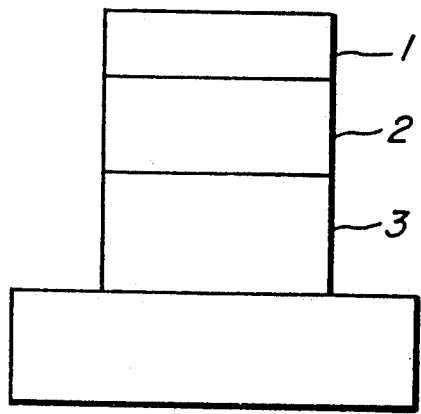
FIG. 25 shows a schematic configuration of a multi-layered coating in accordance with Example 7 with the layers numbered consecutively from the air surface to the substrate.
Figure 26:
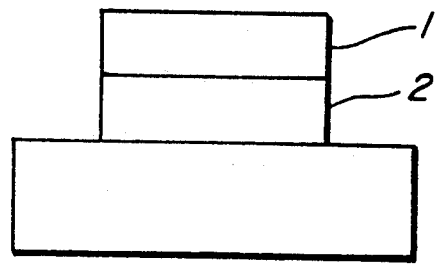
FIG. 26 shows a schematic configuration of a multi-layered coating in accordance with Example 8 with the layers numbered consecutively from the air surface to the substrate.
Figure 27:
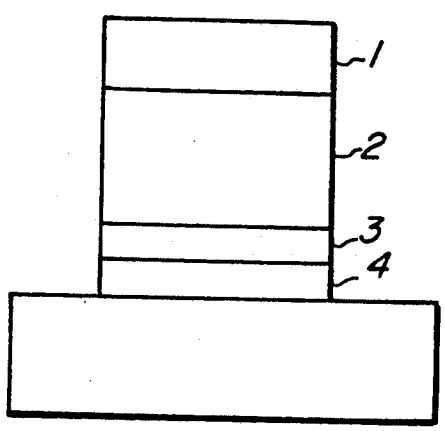
FIG. 27 shows a schematic configuration of a multi-layered coating in accordance with Example 9 with the layers numbered consecutively from the air surface to the substrate.
Figure 28:
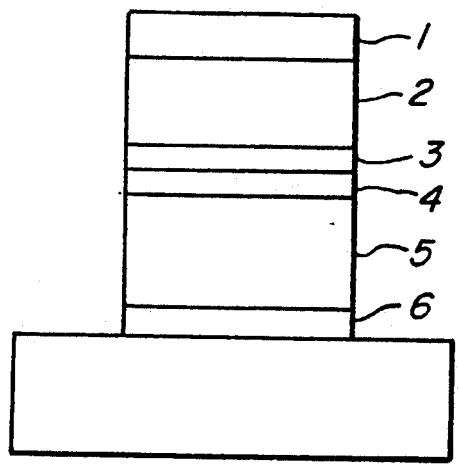
FIG. 28 shows a schematic configuration of a multi-layered coating in accordance with Example 10 with the layers numbered consecutively from the air surface to the substrate.
Figure 29:
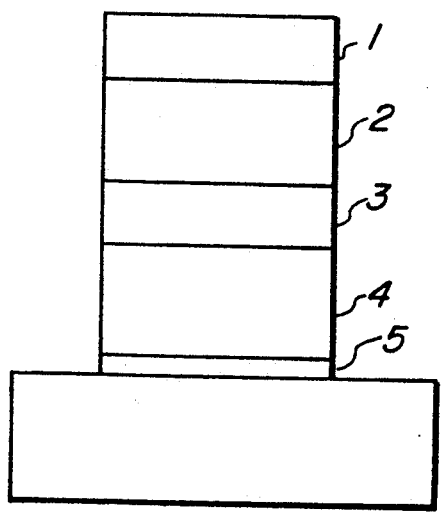
FIG. 29 shows a schematic configuration of a multi-layered coating in accordance with Example 11 with the layers numbered consecutively from the air surface to the substrate.
Figure 30:
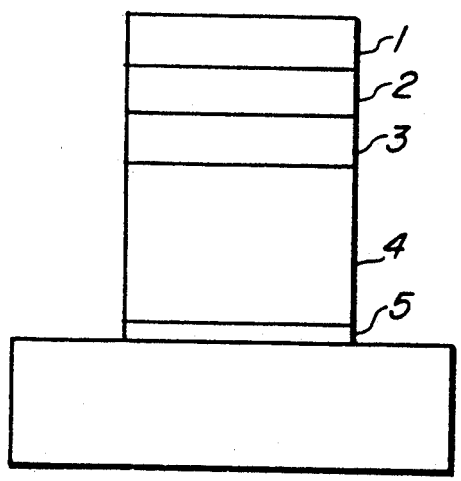
FIG. 30 shows a schematic configuration of a multi-layered coating in accordance with Example 12 with the layers numbered consecutively from the air surface to the substrate.
Figure 31:
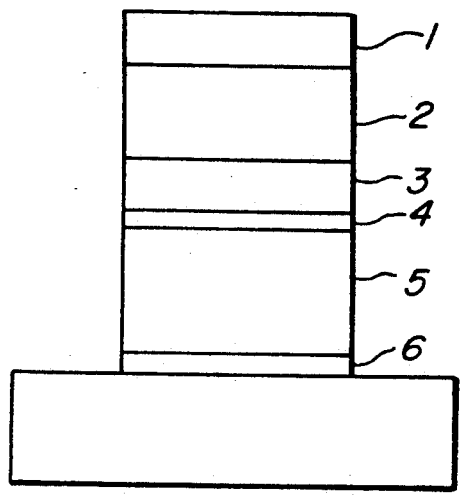
FIG. 31 shows a schematic configuration of a multi-layered coating in accordance with Example 13 with the layers numbered consecutively from the air surface to the substrate.
Figure 32:
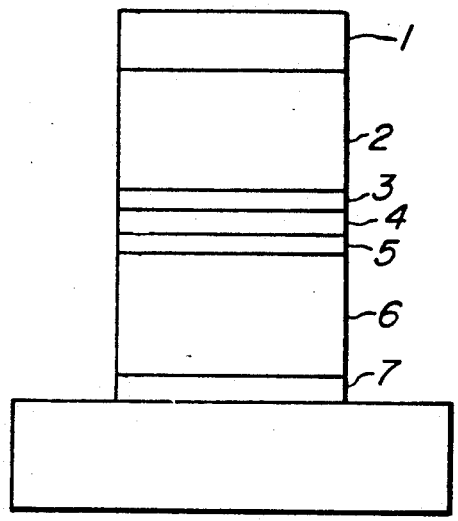
FIG. 32 shows a schematic configuration of a multi-layered coating in accordance with Example 14 with the layers numbered consecutively from the air surface to the substrate.
Figure 33:
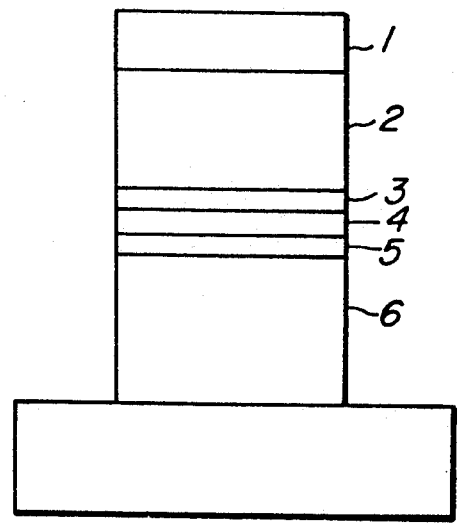
FIG. 33 shows a schematic configuration of a multi-layered coating in accordance with Example 15 with the layers numbered consecutively from the air surface to the substrate.
Figure 34:
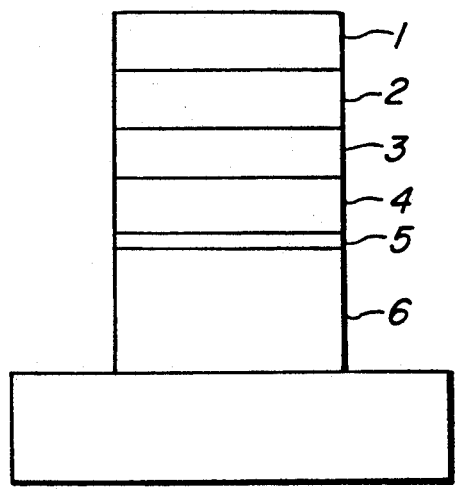
FIG. 34 shows a schematic configuration of a multi-layered coating in accordance with Example 16 with the layers numbered consecutively from the air surface to the substrate.

FIG. 19 shows a schematic configuration of a multi-layered coating in accordance with Example 1 with the layers numbered consecutively from the air surface to the substrate. Thus, layer 1 is SiO$_2$, layer 2 is ZrO$_2$+TiO$_2$, layer 3 is SiO$_2$, layer 4 is Y$_2$O$_3$, and layer 5 is YF$_3$. Each of the subsequent FIGS. 20 through 34 likewise show a schematic configuration of a multi-layered coating on a substrate in accordance with Examples 2 through 16, and the respective layers are also numbered likewise in the corresponding figures, with reference numbers starting with layer 1 as the material adjacent the air surface, and proceeding to progressively larger numbers as the layers approach the substrate.

Figure 35:
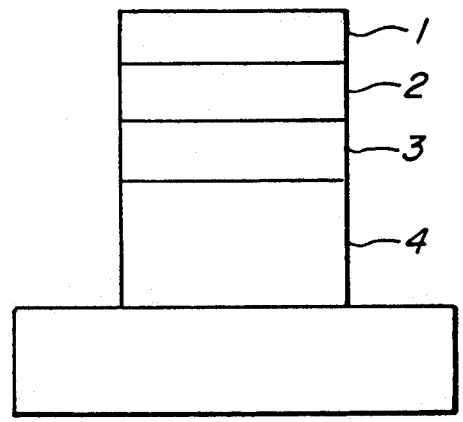
FIG. 35 represents the schematic of the coating of comparative Example 1.

FIG. 35 represents the schematic of the coating of comparative Example 1, set forth in Table 10 with the layers numbered consecutively from the air surface to the substrate. Thus, layer 1 is SiO$_2$, layer 2 is ZrO$_2$+TiO$_2$, layer 3 is ZrO$_2$, and layer 4 is SiO+O$_2$ with a substrate PMMA.

Figure 36:
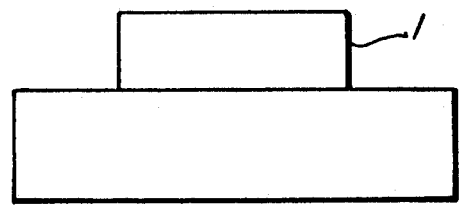
FIG. 36 represents a schematic of the coating of comparative Example 2.

FIG. 36 represents a schematic of the coating of comparative Example 2 set forth in Table 11, with layer 1 being MgF$_2$.

The multi-layered coatings obtained in Examples 1-9 and Comparative Examples 1 and 2 were subjected to durability tests with respect to a separation test by tape, and organic solvent resistant test 1. Separation test by tape Tape is adhered to the surface of the thin multi-layered coatings, and then the tape is peel off perpendicularly. This process is repeated ten times.

2. Organic solvent resistant test.

The surface of the multi-layered coated is rubbed 40 times with a cloth into which alcohol soaks under load of 2 kgf.

TABLE 19

| | tape test | solvent test |
|---|---|---|
| Example 1 | good | good |
| Example 2 | good | good |
| Example 3 | good | good |
| Example 4 | good | good |
| Example 5 | good | good |
| Example 6 | good | good |
| Example 7 | good | good |
| Example 8 | good | good |
| Example 9 | good | good |
| Comp. Example 1 | good | good |
| Comp. Example 2 | partially separated | separated |

The multi-layered coatings obtained in Examples 10–14 were subjected to durability tests with respect to the separation test by tape, the organic solvent resistant test and resistant test to high temperature and high humidity.

The separation test by tape and the organic solvent resistant test are the same as above mentioned. The resistance test to high temperature and high humidity is as follows; the obtained optical parts are left under environmental conditions of 70° C. and 80% for 500 hours.

The results are shown in Table 20

TABLE 20

| | tape test | test on high temperature and high humidity | solvent test |
|---|---|---|---|
| Example 10 | good | good | no trouble |
| Example 11 | good | good | no trouble |
| Example 12 | good | good | no trouble |
| Example 13 | good | good | no trouble |
| Example 14 | good | good | no trouble |

The multi-layered coatings obtained in Examples 15 and 16 were subjected to durability tests with respect to the organic solvent resistant test similarly as above mentioned and observed visually if cracks generated or not.

The results are shown in Table 21

TABLE 21

| | solvent test | generation of cracks |
|---|---|---|
| Example 15 | good | none |
| Example 16 | good | none |

What is claimed is:

1. A multi-layered coating for an optical part comprising:
   a substrate made of synthetic resin;
   a metal chromium layer formed adjacently to the substrate;
   a YF$_3$ layer formed adjacently to the metal chromium layer; and
   a dielectric material layer formed adjacently to the YF$_3$ layer.

2. A multi-layered coating of claim 1, in which the metal chromium layer is 100 Å or less in thickness and the YF$_3$ layer is 500 Å or more in thickness.

3. A multi-layered coating of claim 1, in which the dielectric material layer is composed of four layers, the first layer, the second layer, the third layer and the fourth layer from the air side, having reflection reducing effects:
   the first layer satisfying
      refractive index $n_1 \leq n_s$ optical layer thickness $0.2 \lambda_0 \leq n_1 d_1 \leq 0.3 \lambda_0$, the second layer satisfying
      refractive index $1.8 \leq n_2$ optical layer thickness $0.35 \lambda_0 \leq n_2 d_2 \leq 0.6 \lambda_0$, the third layer satisfying
      refractive index $n_3 \leq n_4$ optical layer thickness $0.03 \lambda_0 \leq n_3 d_3 \leq 0.15 \lambda_0$, and the fourth layer satisfying
      refractive index $n_s \leq n_4$ optical layer thickness $0.03 \lambda_0 \leq n_4 d_4 \leq 0.25 \lambda_0$ wherein
   $n_s$ is the refractive index of the substrate,
   $n_1$ is the refractive index of the first layer,
   $n_2$ is the refractive index of the second layer,
   $n_3$ is the refractive index of the third layer,
   $n_4$ is the refractive index of the fourth layer,
   $d_1$ is the thickness of the first layer,
   $d_2$ is the thickness of the second layer,
   $d_3$ is the thickness of the third layer,
   $d_4$ is the thickness of the fourth layer and
   $\lambda_0$ is a dominant wavelength.

4. A multi-layered coating of claim 1, in which the dielectric material layer is composed of three layers, the first layer, the second layer and the third layer from the air side, having reflection reducing effects, the first layer satisfying
   refractive index $n_1 \leq n_s$ optical layer thickness $0.2 \lambda_0 \leq n_1 d_1 \leq 0.3 \lambda_0$, the second layer satisfying
      refractive index $1.8 \leq n_2$ optical layer thickness $0.35 \lambda_0 \leq n_2 d_2 \leq 0.6 \lambda_0$, and the third layer satisfying
      refractive index $$1.5 \leq n_3 \leq 1.8$$

optical layer thickness $$0.15 \lambda_0 \leq n_3 d_3 \leq 0.35 \lambda_0$$

wherein
$n_s$ is the refractive index of the substrate,
$n_1$ is the refractive index of the first layer,
$n_2$ is the refractive index of the second layer,
$n_3$ is the refractive index of the third layer,
$d_1$ is the thickness of the first layer,
$d_2$ is the thickness of the second layer,
$d_3$ is the thickness of the third layer,
$\lambda_0$ is a design wavelength.

5. A multi-layered coating of claim 4, further comprising a metal chromium layer between the dielectric material layer and the YF$_3$ layer.

6. A multi-layered coating of claim 1, further comprising a metal chromium layer between the dielectric material layer and the YF$_3$ layer.

7. A multi-layered coating of claim 1 wherein the optical part is a half-mirror, in which the dielectric material layer is composed of three layers, the first layer, the second layer and the third layer from the air side,
the first layer satisfying the following:
a refractive index $$n_2 \leq n_1$$

an optical layer thickness $$0.2 \lambda_0 \leq n_1 d_1 \leq 0.3 \lambda_0,$$

the second layer satisfying the following:
a refractive index $$n_2 \leq n_3$$

an optical layer thickness $$0.2 \lambda_0 \leq n_2 d_2 \leq 0.3 \lambda_0,$$

and the third layer satisfying
a refractive index $$n_3 \leq n_s$$

an optical layer thickness $$0.2 \lambda_0 \leq n_3 d_3 \leq 0.3 \lambda_0$$

wherein
$n_s$ is the refractive index of the substrate,
$n_1$ is the refractive index of the first layer,
$n_2$ is the refractive index of the second layer,
$n_3$ is the refractive index of the third layer,
$d_1$ is the thickness of the first layer,
$d_2$ is the thickness of the second layer,
$d_3$ is the thickness of the third layer, and
$\lambda_0$ is a design dominant wavelength.

8. A multi-layered coating for an optical part comprising:
a substrate made of synthetic resin;
a YF$_3$ layer formed adjacently to the substrate,
a SiO$_2$ layer formed adjacently to the YF$_3$ layer; and
a dielectric material layer formed adjacently to the SiO$_2$ layer.

9. A multi-layered coating of claim 8, in which the total thickness of the YF$_3$ layer and the SiO$_2$ layer is 1000 Å or more.

10. A multi-layered coating of claim 8, in which the dielectric material layer is composed of four layers, the first layer, the second layer, the third layer and the fourth layer from the air side having reflection reducing effects:
the first layer satisfying
refractive index $$n_1 \leq n_s$$

optical layer thickness $$0.2 \lambda_0 \leq n_1 d_1 \leq 0.3 \lambda_0,$$

the second layer satisfying
refractive index $$1.8 \leq n_2$$

optical layer thickness $$0.35 \lambda_0 \leq n_2 d_2 \leq 0.6 \lambda_0,$$

the third layer satisfying
refractive index $$n_3 \leq n_4$$

optical layer thickness $$0.03 \lambda_0 \leq n_3 d_3 \leq 0.15 \lambda_0,$$

and the fourth layer satisfying
refractive index $$n_s \leq n_4$$

optical layer thickness $$0.03 \lambda_0 \leq n_4 d_4 \leq 0.25 \lambda_0$$

wherein
$n_s$ is the refractive index of the substrate,
$n_1$ is the refractive index of the first layer,
$n_2$ is the refractive index of the second layer,
$n_3$ is the refractive index of the third layer,
$n_4$ is the refractive index of the fourth layer,
$d_1$ is the thickness of the first layer,
$d_2$ is the thickness of the second layer,
$d_3$ is the thickness of the third layer,
$d_4$ is the thickness of the fourth layer and
$\lambda_0$ is a design wavelength.

11. A multi-layered coating of claim 8, further comprising a YF$_3$ layer between the SiO$_2$ layer and the dielectric material layer.

12. In a multi-layered coating for an optical part formed of a synthetic resin, the improvement of:
laminate layers of a YF$_3$ and a dielectric material, the dielectric material having an expansion characteristic to counter a contraction characteristic of YF$_3$, the combined laminate layers having a total thickness of at least 1000 Å with the YF$_3$ layer deposited on the synthetic resin optical part.

13. The invention of claim 12 wherein the dielectric material is $SiO_2$.

14. The invention of claim 13 wherein the optical thickness of $SiO_2$ is 500 Å.

15. A multi-layered coating for an optical part comprising:
   a substrate made of synthetic resin;
   a metal layer formed adjacent to the substrate and having a thickness of 100 Å or less;
   a $YF_3$ layer formed adjacent to the metal layer; and
   a dielectric material layer formed adjacent to the $YF_3$ layer.

16. The invention of claim 15 wherein the metal layer is chromium.

17. The invention of claim 15 wherein a dielectric material layer is deposited on the $YF_3$ layer.

18. The invention of claim 17 wherein the dielectric material is $SiO_2$.

19. The invention of claim 15 wherein a pair of metal layers are deposited, one layer on the synthetic resin and a second layer on the $YF_3$ layer.

20. The invention of claim 19 wherein the pair of metal layers are chromium and do not exceed 100 Å in combined thickness.

21. A multilayered coating for an optical part comprising:
   a substrate made of glass;
   a $YF_3$ layer formed adjacent to the substrate; and
   a dielectric material layer formed adjacent to the $YF_3$ layer and comprising a first layer and a second layer from an air surface to reduce reflection, the first layer satisfying the following:

$n_1 \leq n_s$ $0.2 \lambda_0 \leq n_1 d_1 \leq 0.3 \lambda_0$ and the second layer satisfying the following:

$1.5 \leq n_s \leq 1.8$ $0.15 \lambda_0 \leq n_2 d_2 \leq 0.35 \lambda_0$ wherein:
   $n_s$ is the refractive index of the substrate,
   $n_1$ is the refractive index of the first layer,
   $n_2$ is the refractive index of the second layer,
   $d_1$ is the thickness of the first layer,
   $d_2$ is the thickness of the second layer, and
   $\lambda_0$ is a design dominant wavelength.

22. A multilayered coating for an optical part comprising:
   a substrate made of glass;
   a $YF_3$ layer formed adjacent to the substrate; and
   a dielectric material layer formed adjacent to the $YF_3$ layer and comprising a first layer, a second layer, and a third layer from an air surface to reduce reflection, the first layer satisfying the following:

$n_1 \leq n_s$ $0.2 \lambda_0 \leq n_1 d_1 \leq 0.3 \lambda_0$ the second layer satisfying the following:

$1.8 \leq n_2$ $0.35 \lambda_0 \leq n_2 d_2 \leq 0.6 \lambda_0$ and the third layer satisfying the following:

$1.5 \leq n_1 \leq 1.8$ $0.15 \lambda_0 \leq n_3 d_3 \leq 0.35 \lambda_0$ wherein:
   $n_s$ is the refractive index of the substrate,
   $n_1$ is the refractive index of the first layer,
   $n_2$ is the refractive index of the second layer,
   $n_3$ is the refractive index of the third layer,
   $d_1$ is the thickness of the first layer,
   $d_2$ is the thickness of the second layer,
   $d_3$ is the thickness of the third layer, and
   $\lambda_0$ is a design dominant wavelength.

23. A multilayered coating for an optical part comprising:
   a substrate made of glass;
   a $YF_3$ layer formed adjacent to the substrate; and
   a dielectric material layer formed adjacent to the $YF_3$ layer and comprising a first layer, a second layer, a third layer, and a fourth layer from an air surface to reduce reflection, the first layer satisfying the following:

$n_1 \leq n_4$ $0.2 \lambda_0 \leq n_1 d_1 \leq 0.3 \lambda_0$ the second layer satisfying the following:

$1.8 \leq n_2$ $0.35 \lambda_0 \leq n_2 d_2 \leq 0.6 \lambda_0$ the third layer satisfying the following:

$n_3 \leq n_4$ $0.03 \lambda_0 \leq n_3 d_3 \leq 0.25 \lambda_0$ and the fourth layer satisfying the following:

$n_s \leq n_4$ $0.03 \lambda_0 \leq n_4 d_4 \leq 0.25 \lambda_0$ wherein:
   $n_s$ is the refractive index of the substrate,
   $n_1$ is the refractive index of the first layer,
   $n_2$ is the refractive index of the second layer,
   $n_3$ is the refractive index of the third layer,
   $n_4$ is the refractive index of the fourth layer,
   $d_1$ is the thickness of the first layer,
   $d_2$ is the thickness of the second layer,
   $d_3$ is the thickness of the third layer,
   $d_4$ is the thickness of the fourth layer, and
   $\lambda_0$ is a design dominant wavelength.

24. A multi-layered coating for an optical part comprising:
   a substrate made of synthetic resin;
   a $YF_3$ layer of at least 1000 Å in thickness formed adjacent to the substrate; and
   a dielectric material layer formed adjacent to the $YF_3$ layer.

25. A multi-layered coating of claim 24, in which the dielectric material layer is composed of one layer having reflection reducing effects, and having an optical layer thickness ($n_1 d_1$) within the range of $0.2 \lambda_0 \leq n_1 d_1 \leq 0.3 \lambda_0$ wherein the $\lambda_0$ represents a design wavelength.

* * * * *